United States Patent [19]  
Vanderveer et al.

[11] 4,444,799  
[45] Apr. 24, 1984

[54] METHOD AND COMPOSITION FOR PRODUCING SOFT EDIBLE BAKED PRODUCTS AND AN EDIBLE FIRM GEL FOR USE THEREIN

[75] Inventors: Fred Vanderveer, Mahwah; Aloysius J. Knipper, Ringwood; Robert Straka, Pequannock; Alex J. Squicciarini, Fairlawn, all of N.J.

[73] Assignee: Nabisco, Inc., East Hanover, N.J.

[21] Appl. No.: 293,924

[22] Filed: Aug. 18, 1981

[51] Int. Cl.³ .................... A21D 10/00; A23L 1/04
[52] U.S. Cl. .................... 426/549; 426/573; 426/575; 426/653; 426/658; 426/331
[58] Field of Search ............ 426/573, 575, 331, 321, 426/560, 653, 555, 549, 658

[56] References Cited

U.S. PATENT DOCUMENTS

| | | | |
|---|---|---|---|
| 3,119,697 | 1/1964 | Leo et al. | 426/575 |
| 3,342,612 | 9/1967 | Foster et al. | 426/575 |
| 3,352,688 | 11/1967 | Messina | 426/575 |
| 3,362,831 | 1/1968 | Szezesniak | 426/575 |
| 3,493,382 | 2/1970 | Ryan et al. | 426/575 |
| 3,656,967 | 4/1972 | Barton et al. | 426/573 |
| 3,892,871 | 7/1975 | Cooper | 426/573 |
| 4,146,652 | 3/1979 | Kahn et al. | 426/573 |
| 4,344,969 | 8/1982 | Youngquist et al. | 426/18 |

FOREIGN PATENT DOCUMENTS 1579324 11/1980 United Kingdom ............... 426/575

Primary Examiner—Raymond N. Jones  
Assistant Examiner—Elizabeth A. Hatcher

[57] ABSTRACT

Soft cookies, biscuits, snacks and the like, are produced from a specially formulated and prepared dough and then baked to produce said soft edible products which retain their fresh-baked, moist, tender texture for extended periods of time. A firm gel, formed from a viscous liquid, e.g., a corn syrup, a gum, e.g., an alginate gum, a humectant and dispersing agent for the gum, e.g., glycerine, a calcium source for gelling the gum, and humectant and dispersing agent for the gum, e.g., propylene glycol, is incorporated into the cookie or other dough prior to baking.

18 Claims, No Drawings

METHOD AND COMPOSITION FOR PRODUCING SOFT EDIBLE BAKED PRODUCTS AND AN EDIBLE FIRM GEL FOR USE THEREIN

FIELD OF THE INVENTION

This invention relates to a composition or formulation and a process by which a relatively neutral-flavor gel ingredient is produced and incorporated in a base dough for the preparation of soft, edible, baked products, especially soft cookies in varieties such as chocolate chip, peanut butter, molasses, etc., the soft, edible, baked products having a surprisingly long and extended shelf-life.

More particularly, the preferred raw materials, utilized to prepare the neutral-flavor gel, in proportions and in a manner described in greater detail hereinafter, comprise a high-fructose corn syrup, glycerine, an alginate gum, calcium sulfate dihydrate, and propylene glycol.

BACKGROUND AND OBJECTS OF THE INVENTION

Traditionally, adequate moisture, softness and freshness have been retained in soft cookies and snacks through the use of ground raisins or other fruit pastes incorporated into the dough. These materials, however, impart a fruity taste to the dough that is acceptable in oatmeal-apple, or raisin flavored cookies, for example, but is not appropriate for soft chocolate chip, peanut butter, molasses or other varieties of soft, non-fruit tasting cookies, snacks and the like.

It is, therefore, among the primary objects of the invention to provide a suitable replacement or substitute for ground fruits or fruit pastes that has the desired properties of bland flavor, high moisture retention properties in baked products, compatability with dough mixing and handling processes, and costs comparable to the prior art fruit pastes.

It is another object of this invention to provide a firm gel system, comprising five essential ingredients, which is shelf-stable in character and which can be stored in sealed shipping units for indefinite periods of time and later distributed to baking locations or plants for production of soft-textured cookies, biscuits, snacks and the like.

Edible gel formulations are known in the art, but they are usually based on an aqueous system and used for filling baked products, for example, jelly-filled doughnuts and jelly rolls, see U.S. Pat. No. 3,352,688, describing an aqueous-based light bodied gel containing a water-soluble alginate which is said to be free from gumminess and heat- and freeze-resistant. Typical of the prior art, this teaching relates only to the filling utilized in baked goods, and not to the preparation of a soft-textured, moisture-retaining, cookie dough.

In another teaching, typical of the prior art, dessert gels (U.S. Pat. No. 3,342,612) are taught which have the capacity to gel at room temperatures, which is said to be of particular advantage in tropical or subtropical, low income regions where refrigeration often is not available. Once again, the gel is based on an aqueous system, which in this instance utilizes carrageenin to prepare the dessert gel.

Another aspect of applicant's invention involves the use of a humectant such as glycerine in the preparation of the gel system. Humectants, of course, have long been used in the food industry, and more particularly in the preparation of baked goods. One such teaching relevant to this point is U.S. Pat. No. 3,656,967, believed to cover the familiar "Pop-Tart" dessert or breakfast items, comprised typically of a fruit-filled product, adapted to be heated in a common toaster oven for one to two minutes to produce an edible product having the desired eating quality wherein the filling softens to a plastic or gelled condition and the crust has a crisp fresh-baked texture. While the unbaked two-phase products taught in this prior art is said to have a storage period of say six (6) months, when properly packaged, the two phases (dough and filling) are formulated in such a manner that upon heating in a toaster oven, moisture is transferred from the outer dough or crust to the fruit-filling which additionally retains and increases its moisture content, in part, by the aid of a hydrophillic agent or humectant, such as glycerine or sorbitol. It is especially noted that a gel system is not taught or used in the dough portion of said two-phase product; indeed, the object of this prior art teaching is to produce a crust which is "crisp" upon baking and not soft-textured as in applicant's invention.

In another teaching of the prior art, a molded edible product (e.g. for a child's toy) may contain carrageenen to bind and/or gel a system containing glycerol and/or propylene glycol, note U.S. Pat. No. 3,493,382. Edible products are capable of being produced at quite relatively low baking temperatures, for example, 195° F. to 200° F., which makes it effective to provide an edible product which a child user may readily make with safety. Such teachings, of course, would be hardly relevant to the large-scale, industrial, high-volume production of soft-textured cookies having an extended shelf-life contemplated by the present invention.

In another teaching of the prior art (U.S. Pat. No. 3,119,697), stabilized icings are prepared using an agar or modified agar gelling agent in an aqueous system. This prior art does not teach or suggest how to make soft-textured, baked cookie products having extended shelf-life as contemplated by the present invention.

DETAILED DESCRIPTION OF THE INVENTION

The firm gel system, or dough conditioner as it is sometimes referred to, comprises five essential ingredients:

(A) an edible viscous liquid such as high fructose corn syrup which functions primarily as a humectant, (B) an edible gum capable of being gelled or set by calcium ion, e.g., sodium alginate which is used primarily to gel the system, (C) an edible dispersing agent for the gum, e.g., glycerine, which functions primarily as a dispersing agent for the gum and humectant, (D) an edible calcium salt, e.g., calcium sulfate dihydrate which is used primarily to set the gel system and (E) an edible dispersing agent for the calcium salt, e.g., propylene glycol which functions primarily as a dispersing agent for the calcium salt and humectant.

Suitable edible viscous liquids (A) are high-fructose corn syrup, sucrose syrup, regular-, high-, or low-dextrose corn syrups, honey, molasses, glycerine or any other type of viscous liquid or syrup as will be readily apparent to those skilled in the art. A suitable substitute for the glycerine (C) comprises any edible liquid, for example, sorbitol, or edible solid that would not interact (or only interact very slowly) with the other ingredients and still have the ability to disperse the alginate gum into the system. A suitable substitute for the sodium alginate gum (B) comprises potassium alginate or ammonium alginate and other gums capable of being gelled or set by calcium, e.g., carrageenan, guar gum, locust bean gum, starch, protein and the like. Furthermore, calcium alginate can be used as the edible gum in which case the edible calcium salt (D) is not needed; however, prolonged gelling times normally associated with calcium alginate can be a problem in production situations wherein delays might be experienced in waiting for the mixture to gel before stacking or storing. A suitable substitute for (D), the calcium sulfate dihydrate, would comprise any food grade calcium salt, for example, monocalcium phosphate monohydrate, MCP, monocalcium phosphate anhydrous, calcium sulfate, calcium carbonate, calcium lactate, tricalcium phosphate, etc. A suitable equivalent for the propylene glycol dispersing agent and humectant (E) would comprise any liquid or solid that would not interact or interact very slowly with the gum or food grade calcium salt but is active in dispersing the calcium salt in the system. In the less preferred case mentioned above where no calcium salt is used the dispersing agent (E) can also be eliminated. As regards the ranges of amounts of ingredients of the firm gel, it being understood that the substitute materials mentioned hereinabove may also be used in approximately the same or similar amounts, and on a parts per 100 parts by weight basis of component (A), i.e., the edible viscous liquid, e.g., high fructose corn syrup, component (B), i.e., the edible gum, e.g., sodium alginate, can vary from about 0.25 to about 4 parts by weight. Component (C), the edible dispersing agent for the gum, e.g., glycerin, can range from about 2 to about 7 or more parts by weight and is used in an amount sufficient to disperse the gum in the viscous liquid. Lower amounts than about 2 might be capable of dispersing the gum, however, at about 2 parts by weight have been generally found to be necessary for the dispersal. Once dispersed, additional amounts of the glycerin or other component (C) can be used even though not necessary for dispersing the gum. Component (D), the edible calcium salt, can vary from about 1 to about 4 parts by weight and the amount is selected to provide the desired gelling time consistent with production procedures. Lower amounts of the calcium salt will increase the gelling time whereas increased amounts will cause the mixture to set or gel more rapidly. The amount of edible dispersing agent, component (E), for the calcium salt should be sufficient to slurry the calcium salt and can vary from about 0.5 to about 3 parts by weight.

The firm gel composition is very easily prepared by first blending the edible gum (B) with the humectant, dispersing agent (C) for the gum to a thick, syrup-like, lump-free consistency. The resulting blend is then mixed into the edible viscous syrup (A) and mixed for sufficient time to provide a uniform blend. The edible calcium salt (D) and the edible humectant, dispersing agent (E) for the calcium salt are blended to form a pourable, lump-free slurry and the resulting slurry is mixed into the blend viscous liquid gum and gum dispersing agent and mixing is continued until a uniform dispersion is obtained. The resulting mixture is then poured into containers which are then sealed and mixture is allowed to set. After it has set the containers can be stacked and stored or shipped. At some later point the firm gel can be used in the preparation of a cookie or cake dough or batter.

A typical dough for making soft cookies, snacks and cakes can contain flour, sugar and/or a syrup sweetener such as invert syrup or high fructose syrup, shortening, baking powder and water. The amounts of these ingredients can vary over a very wide range depending upon the end product desired and the particular processing steps to be utilized. Based on 100 pounds of flour, the amount of sweetener, e.g. sugar, invert syrup, high fructose syrup or mixtures thereof can vary from 25 to 150 pounds depending upon the sweetness desired in the final product. In the sweetener composition, the granulated sugar can vary from zero to 150 pounds and the invert syrup or high fructose syrup can vary from zero to 150 pounds. The amount of shortening can be varied from zero, preferably about 20, to about 80 pounds. The firm gel component of this invention can be incorporated in amounts of about 2 to about 100 pounds. The amount of baking powder present can vary from none up to about 5 pounds. When no baking powder is used, air can be whipped into the dough or batter during creaming. Water can be added up to the desired amount keeping in mind that the flour normally contains about 12–14% moisture, the invert syrup or high fructose syrup contains about 20 or more percent water and the firm gel can contain substantial amounts of water, e.g., 19–20% or more. Considering all sources including separately added water, the moisture content of the dough composition can range from 20 to 60% and sufficient water should be present to provide the desired consistency to the dough to enable proper working and shaping of the dough.

When granulated sugar is employed the firm gel can be mixed with the granulated sugar until the firm gel forms beadlets. Alternatively, especially when granulated sugar is not employed, the firm gel system can be ground in a food chopper and then blended with the granulated sugar, if used, or can be mixed directly with the invert syrup (high fructose corn syrup), shortening and water. In the event no invert syrup or other sweetening syrup is used, the firm gel is mixed with the granulated sugar to disperse it on the sugar in the form of beadlets and the resulting blend is mixed with the shortening and water. Mixing is continued until a smooth consistency is obtained and thereafter the flour and baking powder are added and mixing is continued to form a smooth dough.

The dough is cut or otherwise shaped into the form and size of cookie or snack desired in a conventional manner and then is baked by convention procedures. Baking temperatures of about 325° F. to about 450° F. can be used. The higher temperatures will require less time for baking a givn form of dough. For example, for cookies the time can be as low as six minutes and for cakes about eighteen or twenty minutes might be needed. The times and temperatures are conventional and the skilled baker can utilize any suitable times and temperatures consistent with good baking practices.

In the following examples, all parts and percentages are by weight unless otherwise stated.

EXAMPLE I

Formulation of the Firm Gel System or Dough Conditioner

| Component | Parts by Weight On a Parts Per Hundred Basis | Pounds |
|---|---|---|
| High Fructose Corn Syrup | 93.90 | 2000 |
| Glycerine | 2.82 | 60 |
| Sodium Alginate Gum* | 1.17 | 25 |
| Calcium Sulfate Dihydrate | 1.17 | 25 |
| Propylene Glycol | 0.94 | 20 |
| | 100.00 | 2130 |

*Kelco Gel HV sold by Kelco Division, Merck & Co., Inc., Clark, New Jersey

Mixing Procedure

The corn syrup is added to a suitable kettle, and cooled to, or maintained at, approximately 70° F. The sodium alginate gum and glycerine are pre-mixed or blended to a thick, syrup-like, lump-free consistency and the alginate/glycerine blend is then added to, and mixed with, the corn syrup in the kettle for about 15 minutes. The calcium sulfate dihydrate and propylene glycol are also pre-mixed or blended to a pourable, lump-free slurry and then added to the kettle and mixed therein until uniformly incorporated (this usually takes about 5 to 10 minutes). The kettle contents are then poured directly into plastic-lined shippers or containers which are properly sealed whereupon the mixture is allowed to gel and set. The gelled mixtures in the containers are then stacked and stored or shipped. The firm gel can be used thereafter in a baking step for making soft-textured cookies (described hereinafter) or held for some time and then distributed to the baking location or baking plant.

EXAMPLE II

Making Soft Cookies With Extended Shelf-Life Utilizing the Firm Gel System of Example I Above

| | Lb. |
|---|---|
| Wheat Flour (Bread Type) | 100 |
| Sugar, Granulated | 40 |
| Invert Syrup (HFCS)* | 10 |
| Shortening, Hydrogenated | 30 |
| Firm Gel System (Example I) | 25 |
| Baking Powder | 1.5 |
| Water | 10 |
| | 216.5 |

*High Fructose Corn Syrup

Depending on the type of soft cookie or snack desired, the formulation could, of course, contain cocoa, chocolate, chocolate chips, oats, peanut butter, eggs, milk, raisins, nuts, artificial and/or natural flavoring or a variety of other ingredients normally used in the making of cookies or cakes, all in accordance with techniques well known in the art.

2. Mixing and Baking Procedure

The firm gel system is dispersed on the granulated sugar and mixed until the firm gel is in the form of beadlets (approximately 1/32" diameter). (Alternatively, the firm gel system could be ground in a food chopper and then blended with the sugar as an alternate to this step.) Then, to the above, are added, with mixing, the invert sugar, the shortening and water and mixing is continued until a smooth consistency is obtained. Then, the flour and baking powder are added to the above and mixed to form a smooth dough. The dough is cut or otherwise formed into the size cookie or snack desired and then baked at a temperature ranging from about 325° F. to about 450° F. for about 6 minutes to about 18 or 20 minutes. The cookies resulting from the formulation, mixing procedure and baking have an extended shelf-life of at least 6 months while retaining a moist and soft texture.

We claim:

1. An edible firm gel composition capable of being ground for producing soft-textured baked products from a dough, said gel composition comprising a firm gel formed from a mixture or blend of:
   (A) 100 weight parts of an edible viscous liquid;
   (B) from 0.25 to 4.0 weight parts of an edible gum capable of being set by calcium ions;
   (C) an effective amount up to 7 weight parts of a humectant-dispersing agent for said edible gum;
   (D) from 1 to about 4 weight parts of a calcium ion source for setting said gum and
   (E) an effective amount up to about 3 weight parts of a humectant-dispersing agent for said source of calcium ions;
the percentage set forth in subparagraphs B, C, D, and E, being based upon 100 parts by weight of said edible viscous liquid.

2. Composition as claimed in claim 1 wherein the edible viscous liquid is a high-fructose corn syrup.

3. Composition as claimed in claim 2 wherein said edible gum is sodium, potassium or ammonium alginate; said edible humectant-dispersing agent for said gum is glycerine; said edible source of calcium ions is calcium sulfate dihydrate; said humectant-dispersing agent for said source is propylene glycol.

4. Composition as claimed in claim 1 wherein said edible gum and said source of calcium ions is calcium alginate and said edible humectant-dispersing agent for said source of calcium ions is said edible humectant-dispersing agent for said gum.

5. Composition as claimed in claim 1 wherein said edible viscous liquid and said edible humectant-dispersing agent for said gum is glycerine.

6. Composition as claimed in claim 1 wherein, based on 100 weight parts of said edible viscous liquid, the edible gum is present in an amount of about 0.25 to about 4.0 weight parts; the humectant-dispersing agent for said gum is present in the amount of about 0 to 7 or more weight parts; the calcium ion source is present in the amount of 0 to about 4 weight parts; and said humectant-dispersing agent is present in the amount of 0 to about 3 weight parts.

7. Composition as claimed in claim 3 wherein, based on 100 weight parts of high fructose corn syrup, the edible gum is present in an amount of about 0.25 to about 4; the edible humectant-dispersing agent for said gum is present in an amount of about 2 to about 7 weight parts; the calcium ion source is present in an amount of about 1 to about 4 weight parts; and said humectant-dispersing agent is present in an amount of 0.5 to about 3 weight parts.

8. Composition as claimed in claim 7 comprising about 100 weight parts of high fructose corn syrup; about 1.25 weight parts of sodium alginate; 3 weight parts of glycerine; about 1.25 weight parts of calcium sulfate dihydrate; and about 1 weight part of propylene glycol.

9. Method of making the gel composition claimed in claim 1 comprising mixing said edible gum and said humectant-dispersing agent for said gum to form a substantially uniform first blend, mixing said first blend with said edible viscous liquid to form a substantially uniform second blend; mixing said calcium ion source with said humectant-dispersing agent for said source to form a substantially uniform third blend; mixing said second and third blends to form a substantially uniform fourth blend; dividing said fourth blend into portions; and allowing said portions to stand and set into said edible firm gel compositions capable of being ground.

10. Soft cookie or snack dough composition containing about 2 to about 50 weight percent of the gel composition claimed in claim 1.

11. Baked products having a moist, soft texture and an extended shelf-life prepared by shaping and baking the dough composition claimed in claim 10.

12. The dough composition of claim 10, wherein the gel contained in said dough composition is in beadlet or ground form.

13. The dough composition of claim 10, wherein said gel contained in the dough composition is a mixture of granulated sugar and set gel in the form of beadlets.

14. The dough composition of claim 13, wherein the beadlets are approximately 1/32" diameter.

15. A method of making dough for soft-textured baked products comprising: premixing the edible firm gel composition of claim 1 with granulated sugar until beadlets form; adding sweeteners, shortening and water; and mixing until smooth consistency results; and blending in flour and baking powder to form said dough.

16. A method of making dough for soft-textured baked products comprising: grinding the firm gel composition of claim 1, adding sweeteners, shortening and water: and mixing until a smooth consistency results, and blending in flour and baking powder to form said dough.

17. A method of making dough for producing soft-textured baked products comprising: grinding the firm gel composition of claim 1, mixing said gel composition with dough ingredients including flour to form a dough of smooth consistency, the amount of said gel composition being about 2 to about 50 weight percent of said dough.

18. A method of making dough for producing soft-textured baked products comprising: premixing the firm gel composition of claim 1 with granulated sugar until beadlets form, mixing said beadlets gel with dough ingredients including flour to form a dough of smooth consistency, the amount of said beadlets gel composition being about 2 to about 50 weight percent of said dough.

* * * * *